(12) United States Patent
Burg

(10) Patent No.: US 6,899,045 B2
(45) Date of Patent: May 31, 2005

(54) AIR LUBRICATED LIFTING BODY SHIP

(76) Inventor: Donald E. Burg, 15840 SW. 84th Ave., Miami, FL (US) 33157

( * ) Notice: Subject to any disclaimer, the term of this patent is extended or adjusted under 35 U.S.C. 154(b) by 0 days.

(21) Appl. No.: 10/602,181

(22) Filed: Jun. 23, 2003

(65) Prior Publication Data

US 2004/0011270 A1 Jan. 22, 2004

Related U.S. Application Data

(63) Continuation-in-part of application No. 09/977,650, filed on Oct. 15, 2001, now Pat. No. 6,604,484.

(51) Int. Cl.$^7$ .................................................. B63B 1/34
(52) U.S. Cl. ..................................... 114/67 A; 114/289
(58) Field of Search ........................... 114/67 A, 67 R, 114/289, 274

(56) References Cited

U.S. PATENT DOCUMENTS

| | | | | | |
|---|---|---|---|---|---|
| 3,946,823 | A | * | 3/1976 | Oler | 180/23 |
| 5,415,120 | A | * | 5/1995 | Burg | 114/67 A |
| 5,860,380 | A | * | 1/1999 | Burg | 114/67 A |
| 5,967,071 | A | * | 10/1999 | Wipper | 114/67 A |

* cited by examiner

Primary Examiner—Stephen Avila

(57) ABSTRACT

Presented is a lifting body ship that has a blower pressurized air layer disposed in the underside of its lifting body such that the air layer reduces wetted area friction and hence the propulsive power required is greatly reduced. Further, a water propulsor is supplied that takes in water through transversely oriented water inlets in the top of the lifting body to thereby reduce turbulence and its associated drag that would normally occur over the top of the lifting body.

24 Claims, 2 Drawing Sheets

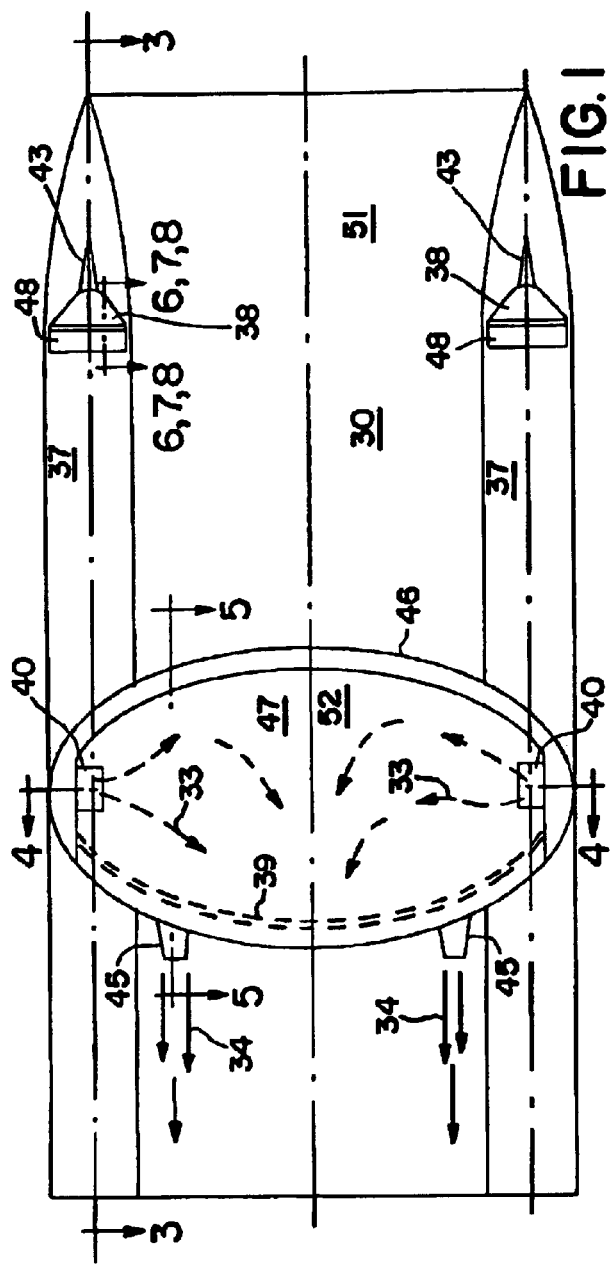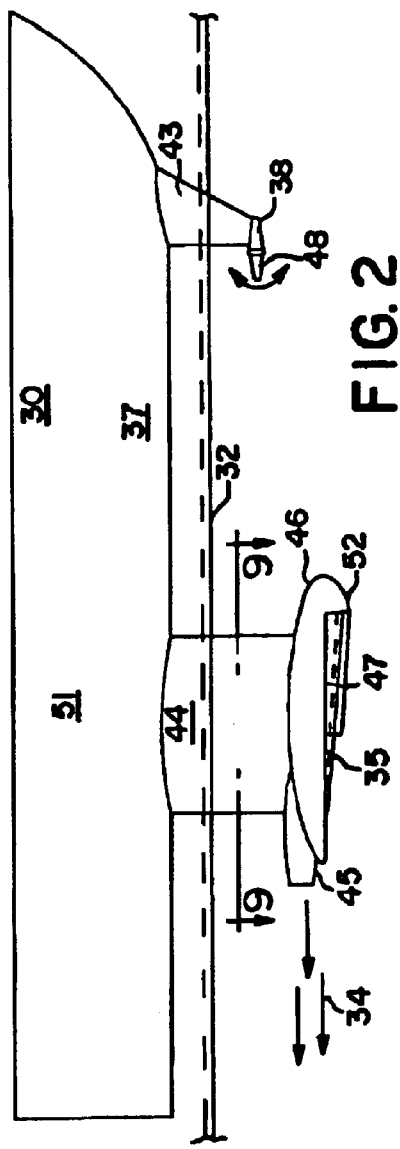

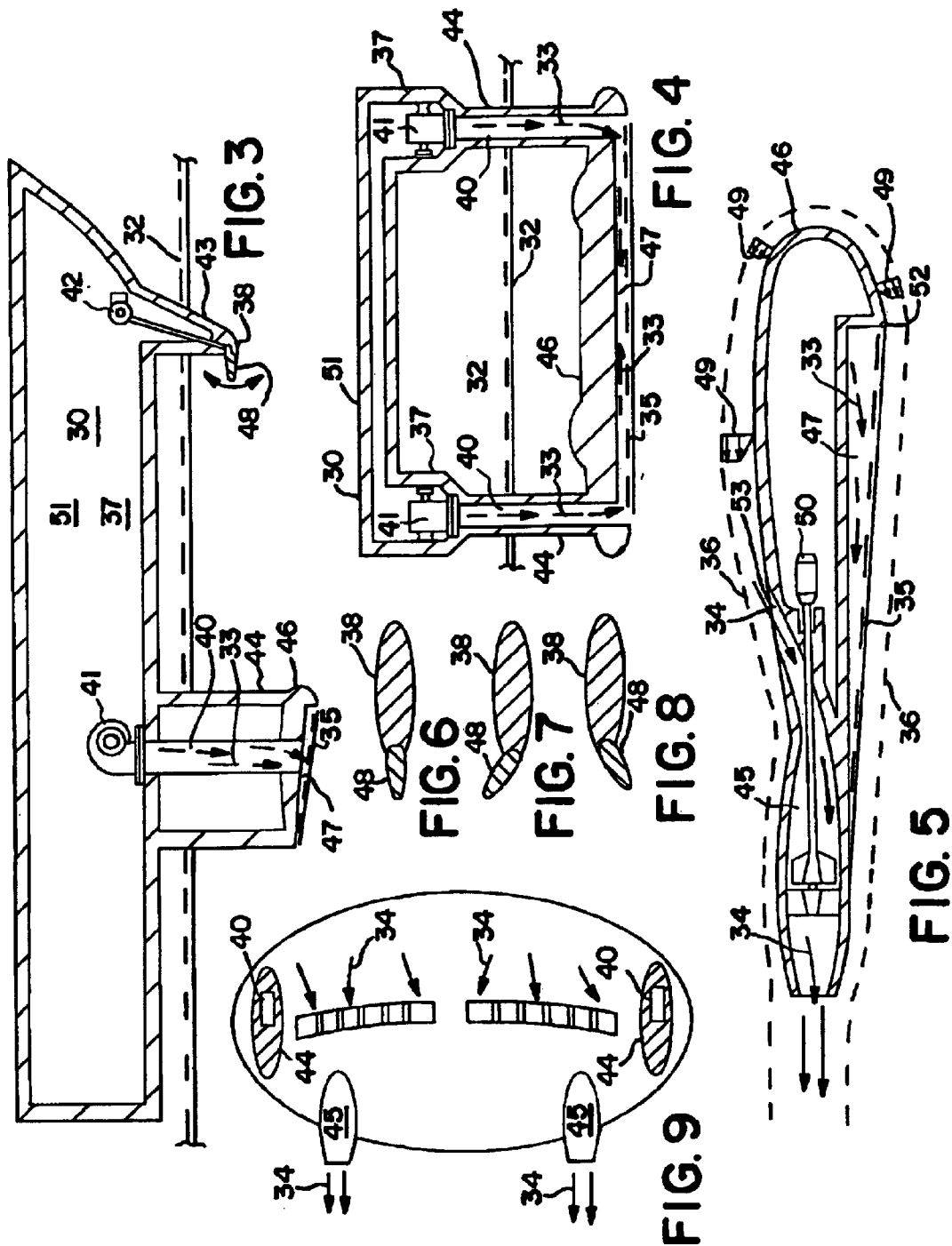

AIR LUBRICATED LIFTING BODY SHIP

CROSS REFERENCE TO OTHER APPLICATIONS

This application is a continuation-in-part to applicant's earlier application Ser. No. 09/977,650 filed Oct. 15, 2001 now U.S. Pat. No. 6,604,484.

FIELD OF THE INVENTION

This invention relates to the field of marine vehicles or ships that are at least partially supported by submerged bodies and in particular to submerged bodies that are most commonly called lifting bodies. The lifting body is normally connected to the main hull of the ship by a strut or struts. The advantage of this Lifting Body Ship (LBS) concept is that it provides a very stable vessel in rough seas since the main structure piercing the surface of the water is the rather small struts that connect the hull and the lifting body. The lifting body has a large horizontal surface top and bottom so it sees very little movement in big seaways.

BACKGROUND OF THE INVENTION

Applicant has done extensive work with both Surface Effect Ship(s) (SES) in the form of his SEACOASTER SES designs and Air Lubricated Ship(s) (ALS). The SEA-COASTER SES is seeing good success in the commercial area in the form of a high speed passenger ferry and is now the recipient of a government funded program to evaluate it for high speed navel vessels. He has run model tests on his ALS concepts.

The big difference between the SEACOASTER SES and the ALS is that the SEACOASTER SES, as is the case of other SESs, starts with the bow at or near the water surface and blower pressurized air then forces the level of the water inside of an air cavity in the underside of the SEACOAST-ER's hull down going from the bow to the stern. In the case of the ALS, the bow of the vessel is, at least in the main, lower than the air layer after a discontinuity such as a step in the bottom of the ALS forward of the air layer. The blower pressurized air layer then rises going from the forward discontinuity to the stern of the ALS.

Why the different approaches for the SES and the ALS? The SES is accepted as being more efficient from a hull resistance standpoint since it does not have the drag of the deeply submerged bow that the ALS has. However, the blower power required for the SES is considerably higher than for the ALS. The reason is that the air pressure in the SES's air cushion must physically force the water level down going from the bow to the stem. The ALS air layer requires only a small amount of makeup air since the bow forward of the air layer has already made a deep hole in the water. The SES therefore requires more blower power than the ALS. This is not a problem for the SES up to vessels of say 400–600 feet; however, at large sizes the blower power for the SES can equal the required propulsive power. For example, a 750 foot SES may require only half of the propulsive power of an equal size standard hull but it may require just as much power to run its blowers. A 750 foot ALS may offer a 25 percent efficiency gain compared to a standard hull but requires only five percent of propulsive power for its blowers. This gives the advantage to the ALS for the 750 footer.

Just to keep things in perspective, a 150 foot SES requires only about half of the propulsive power of a standard hull but it requires an additional 10–15 percent of the propulsive power to power its blowers. A similar size ALS would offer about a 20 percent reduction in propulsive power but would require only about five percent for its blower power. So the advantage goes to the SES here.

After all of this discussion, we now come to the instant invention. There has been some progress recently in the design and testing of Lifting Body Ships (LBS). However, they are not as efficient as the SES or the ALS. The main advantage show by the LBS is its extreme stability in rough seas.

The instant invention applies air lubrication to the underwater lifting body of the LBS. This makes for a much more efficient LBS especially at high speeds. Further, the instant invention can utilize propulsor water inlets that enhance the boundary layer characteristics over the top of the lifting body thereby increasing the efficiency of lift of the LBS's lifting body.

SUMMARY OF THE INVENTION

The main object of the instant invention is to provide an improved lifting body ship having one or more strut-like members that connect a lifting body to a hull of the ship where the lifting body has, as seen in a bottom plan view, at least in its majority a curvilinear shape with an artificially pressurized gas layer disposed in the underside of said lifting body.

A related object of the invention is that the artificially pressurized gas layer, as seen in the bottom plan view, is at least in its majority curvilinear over its forward portions.

Another related object of the invention is that a forward and lower portion of the artificially pressurized gas layer be defined by a discontinuity in a lower surface of the lifting body.

A further object of the invention is that the artificially pressurized gas layer be supplied with pressurized gas by a powered blower with the conduit for passing the pressurized gas to the artificially pressurized gas layer from the powered blower internal to a duct disposed, at least in its majority, inside of one of the strut-like members.

Yet another object of the invention is that the gas layer in the underside of the artificially pressurized gas layer, at least mainly, rises going from forward to aft.

A further object of the invention is that it includes a water propulsor that is at least in part disposed internal to the lifting body and that takes in at least part of its water used for propulsion through one or more water inlets disposed over a top surface of the lifting body.

A directly related object of the invention is that one or more of the water inlets be transversely oriented over an upper surface of the lifting body.

Still another directly related object of the invention is that one or more of the transversely oriented water inlets be, at least in their majority, aft of a longitudinal midpoint of the lifting body.

Yet another object of the invention is that the lifting body, as seen in a vertical transverse plane of the improved lifting body ship, be at least in part curvilinear in shape.

A directly related object of the invention is that the lifting body, as seen in a vertical transverse plane of the improved lifting body ship, be at least in part elliptical in shape.

Another object of the invention is that there be one or more trim control hydrofoils disposed forward of the lifting body to thereby aid in pitch and trim control of the lifting body ship.

BRIEF DESCRIPTION OF THE DRAWINGS

FIG. 1 presents a bottom plan view of the instant invention Air Lubricated Lifting. Body Ship (AL LBS). Shown are a main lifting body that has an air lubricated under surface and forward trim hydrofoils in this version of the instant invention.

FIG. 2 shows a side profile view of the instant invention AL LBS.

FIG. 3 presents a cross section, as taken through vertical longitudinal plane 3—3 of FIG. 1, that shows cross sections of forward and aft struts. The aft strut cross section shows how the blower supplies pressurized gas or air to the air layer under the lifting body.

FIG. 4 gives a transverse cross section, as taken through vertical plane 4—4 of FIG. 1, that shows the main hull and its sidehulls and how the lifting bodies struts support and also supply air to the underside of the lifting body.

FIG. 5 is an enlarged cross section, as taken through line 5—5 of FIG. 1, that shows the lifting body and how its air layer rises from a forward step in the lifting body. Also importantly shown is a propulsor, a water jet in this instance, that takes in part of the boundary layer over the top of the lifting body. This concept allows the water layer above the lifting body to be more uniform and avoids high drag turbulence in the area of the inlet. It is important to note that the water inlets are best arranged to be wide transversely and, in its preferred embodiment, stretching as a sum of their total openings over a large part of the width of the lifting body.

FIGS. 6, 7, and 8, taken through vertical planes 6, 7, and 8 of FIG. 1, show a preferred arrangement of forward stability and trim hydrofoils.

FIG. 9, taken through horizontal plane 9—9 of FIG. 1, shows a top view of the lifting body. Note the gas passageways in the struts and, particularly, the transversely spread water inlets of the water jet propulsor.

DETAILED DESCRIPTION

FIG. 1 presents a bottom plan view of the instant invention air lubricated lifting body ship 30. Shown are sidehulls 37, forward trim hydrofoils 38 and their trim elevators 48, hydrofoil struts 43, main hull 51, lifting body 46, that includes a gas or air layer 47, gas or air flow passageway 40, gas or air flow arrows 33, water propulsor 45, water flow arrows 34, and air layer waterline 39. Note that the air layer waterline 39 shows where the air layer 47 may reattach to the lifting body 46. The forward end of the air layer 47 is normally defined by air layer discontinuity such as a step 52.

In the preferred embodiment of the invention, as seen in a plan view as shown here, the lifting body 46 has a generally elliptical or oval shape with a curvilinear outward circumference which makes for an efficient shape. It is also desirable, although not necessary, to have the air layer step or discontinuity 52 be curvilinear in shape as seen in plan view as it is here.

The overall effect of the air layer 47 is to greatly reduce the wetted area and hence the wetted area drag of the underside of the lifting body 46. This is accomplished with very little power required to supply pressurized air to the air layer 47.

FIG. 2 gives a profile view of the instant invention air lubricated lifting body ship 30. Shown is a high speed or dynamic calm sea surface waterline 32. Note that the hydrofoil strut 43 and the lifting body strut 44 do at least most of the wave piercing which makes for a very small waterplane when moving forward at high speed. High speed is defined as any speed above ten knots for purposes of this application. The air layer waterline 35 is also shown here.

FIG. 3 presents a cross section, as taken through vertical plane 3—3 of FIG. 1, that shows an air layer blower 41, air passageway 40, and also a hydraulic system that supplies power to actuate the trim elevator 48 that is part of a forward hydrofoil 38. Other actuators such as electric motors may be used to supply this power of course. Note that in all cases the air layer 47, at least in its majority, rises going from forward to aft.

FIG. 4 is a vertical transverse cross section, as taken through vertical plane 4—4 of FIG. 1, that shows the lifting body 46 in cross section. Note the generally preferred at least partially oval or elliptical shape of this cross section that is generally curvilinear which results in lowest drag.

FIG. 5 presents an enlarged vertical cross section of the lifting body 46, as taken through vertical plane 5—5 of FIG. 1, that shows a water propulsor 45. Note how the water inlet(s) for this water propulsor is taken in through the upper portion of the lifting body 46. This offers major advantages since taking in the water here, preferably aft of a fore to aft midsection of the lifting body 46, helps eliminate areas on the top of the lifting body 46 where the boundary layer 36 would separate and result in increased drag. Note the rising, going for forward to aft, air layer 47 as before.

FIGS. 6, 7, and 8 show cross sections of the forward hydrofoil(s) 38 and their trim elevators 48 while neutral, adding lift, and adding a downward force respectively.

FIG. 9, is a plan view of the lifting body 46, as seen from a horizontal plane 9—9 taken from FIG. 2. Note the preferred low drag airfoil shape of the struts 44 and their air flow passageways 40. It is important to note also the preferably transversely oriented water inlets 53 of the water propulsor. This orientation of the water inlets 53 offers the advantage of being able to bring in water from the boundary layer over a wide surface of the top of the lifting body 46.

While the invention has been described in connection with a preferred and several alternative embodiments, it will be understood that there is no intention to thereby limit the invention. On the contrary, there is intended to be covered all alternatives, modifications and equivalents as may be included within the spirit and scope of the invention as defined by the appended claims, which are the sole definition of the invention.

I claim:

1. In an improved lifting body ship with one or more strut-like members that connect a lifting body to a hull of the ship, the improvement comprising:

said lifting body having, as seen in a vertical longitudinal plane of the improved lifting body ship, at least in its majority a curvilinear shape over its upper surface wherein a water propulsor takes in at least part of its water used for propulsion through one or more water inlets disposed over a top surface of the lifting body and wherein said one or more water inlets are transversely oriented over an upper surface of the lifting body and wherein said one or more transversely oriented water inlets are, at least in their majority, aft of a longitudinal midpoint of the lifting body.

2. The improved lifting body ship of claim 1 which further comprises an artificially pressurized gas layer disposed in an underside of the lifting body.

3. The improved lifting body ship of claim 2 wherein a forward and lower portion of the artificially pressurized gas layer is defined by a discontinuity in a lower surface of the lifting body.

4. The improved lifting body ship of claim 2 wherein the artificially pressurized gas layer is supplied with pressurized gas by a powered blower with the conduit for passing the pressurized gas to the artificially pressurized gas layer from the powered blower is at least in part internal to a duct disposed, at least in its majority, inside of one of the strut-like members.

5. The improved lifting body ship of claim 2 wherein the gas layer in the underside of the lifting body, at least mainly, rises going from forward to aft.

6. The improved lifting body ship of claim 1 wherein the lifting body, as seen in a vertical transverse plane of the improved lifting body ship, is at least in part curvilinear in shape.

7. The improved lifting body ship of claim 6 wherein the lifting body, as seen in a vertical transverse plane of the improved lifting body ship, is at least in part elliptical in shape.

8. The improved lifting body ship of claim 1 which further comprises one or more trim control hydrofoils disposed forward of the lifting body.

9. In an improved lifting body ship with one or more strut-like members that connect a lifting body to a hull of the ship, the improvement comprising:

said lifting body having, as seen in a bottom plan view of the improved lifting body ship, an artificially pressurized gas layer disposed in the underside of said lifting body and wherein a forward portion of the artificially pressurized gas layer is defined by a discontinuity in a lower surface of the lifting body and wherein the artificially pressurized gas layer is supplied with pressurized gas by a powered blower with the conduit for passing the pressurized gas to the artificially pressurized gas layer from the powered blower is internal to a duct disposed, at least in its majority, inside of one of the strut-like members and wherein said strut like members are disposed transversely over the upper surface of the lifting body and wherein an upper surface of the lifting body, as seen in a vertical longitudinal plane of the lifting body ship, is at least mainly curvilinear in shape.

10. The improved lifting body ship of claim 9 wherein the lifting body, as seen in a vertical transverse plane of the improved lifting body ship, is at least in part curvilinear in shape.

11. The improved lifting body ship of claim 9 wherein the gas layer in the underside of the lifting body, at least mainly, rises going from forward to aft.

12. The improved lifting body ship of claim 9 wherein a water propulsor takes in at least part of its water used for propulsion through one or more water inlets disposed over a top surface of the lifting body.

13. The improved lifting body ship of claim 12 wherein said one or more water inlets are transversely oriented over an upper surface of the lifting body.

14. The improved lifting body ship of claim 13 wherein said one or more of the transversely oriented water inlets are, at least in their majority, aft of a longitudinal midpoint of the lifting body.

15. The improved lifting body ship of claim 9 wherein the lifting body, as seen in a vertical transverse plane of the improved lifting body ship, is at least in part curvilinear in shape.

16. The improved lifting body ship of claim 15 wherein the lifting body, as seen in a vertical transverse plane of the improved lifting body ship, is at least in part elliptical in shape.

17. The improved lifting body ship of claim 7 which further comprises one or more trim control hydrofoils disposed forward of the lifting body.

18. In an improved lifting body ship with one or more strut-like members that connect a lifting body to a hull of the ship, the improvement comprising:

said lifting body, as seen in a bottom plan view of the improved lifting body ship, being at least in part curvilinear in shape and having an artificially pressurized gas layer disposed in the underside of said lifting body and which further comprises a water propulsor at least in part disposed internal to the lifting body that takes in at least part of its water used for propulsion through one or more water inlets disposed over a top surface of the lifting body and wherein said one or more water inlets are transversely oriented over an upper surface of the lifting body.

19. The improved lifting body ship of claim 18 wherein said one or more transversely oriented water inlets are, at least in their majority, disposed aft of a longitudinal midpoint of the lifting body.

20. The improved lifting body ship of claim 18 which further comprises one or more trim control hydrofoils disposed forward of the lifting body.

21. The improved lifting body ship of claim 18 wherein a forward portion of the artificially pressurized gas layer is defined by a discontinuity in a lower surface of the lifting body and wherein said discontinuity, as seen in the bottom plan view of the improved lifting body ship, is at least in part curvilinear in shape.

22. The improved lifting body ship of claim 18 wherein the lifting body, as seen in a vertical transverse plane of the improved lifting body ship, is at least in part curvilinear in shape.

23. The improved lifting body ship of claim 18 wherein the artificially pressurized gas layer is supplied with pressurized gas by a powered blower with the conduit for passing the pressurized gas to the artificially pressurized gas layer from the powered blower is internal to a duct disposed, at least in its majority, inside of one of the strut-like members.

24. the improved lifting body ship of claim 18 wherein the gas layer in the underside of the lifting body, at least mainly, rises going from forward to aft.

* * * * *